April 6, 1943.    W. VAN B. ROBERTS    2,315,658
NEGATIVE RESISTANCE DEVICE
Filed Aug. 30, 1941
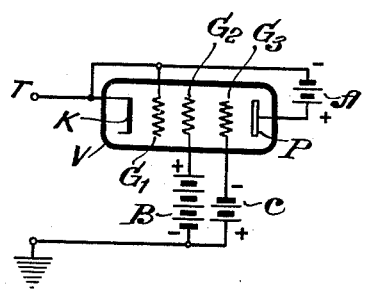
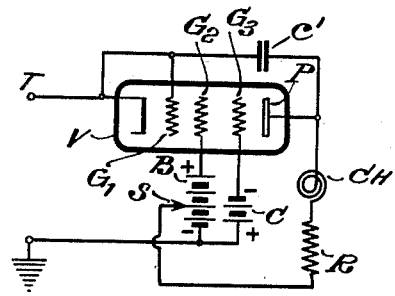
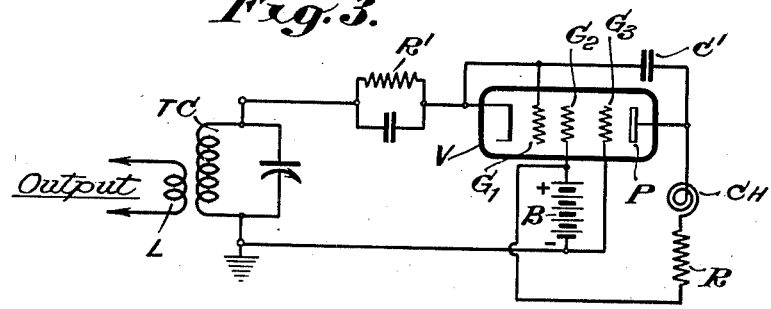
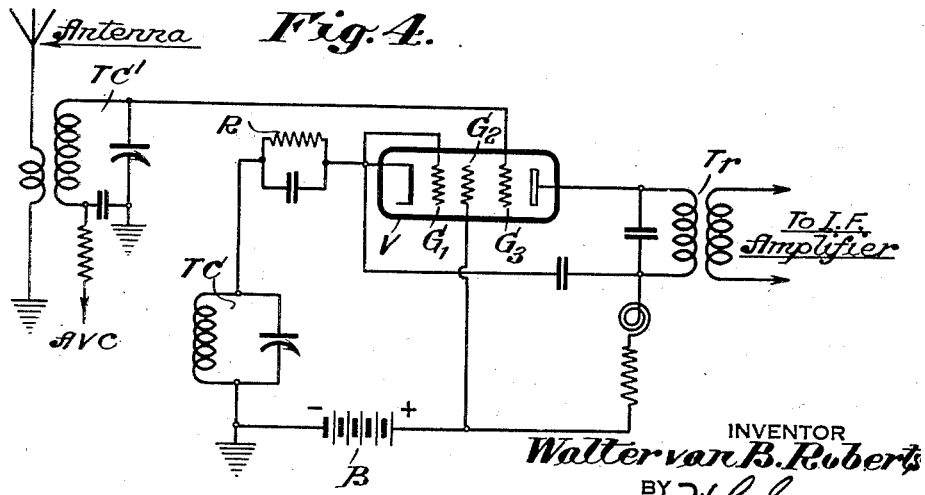
INVENTOR
Walter van B. Roberts
BY H. G. Grover
ATTORNEY Patented Apr. 6, 1943

2,315,658

UNITED STATES PATENT OFFICE 2,315,658

NEGATIVE RESISTANCE DEVICE

Walter van B. Roberts, Princeton, N. J., assignor to Radio Corporation of America, a corporation of Delaware Application August 30, 1941, Serial No. 408,948

11 Claims. (Cl. 250—20)

This invention relates to negative resistance devices generally, and in particular to a novel form of such a device and its application to the generation of relaxation or sinusoidal oscillations and to frequency conversion.

A primary object of the invention is to provide between a pair of terminals one of which is grounded, a negative resistance to alternating currents which resistance is energized solely from one or more power supplies each having one terminal grounded.

A more detailed description of the invention follows in conjunction with a drawing, wherein Figs. 1, 2, 3 and 4 illustrate four different embodiments of the invention.

Throughout the figures of the drawing, the same parts are labeled with the same reference numbers.

Fig. 1 shows the basic circuit of the invention. The tube V may be, for example, an RCA type 57 having a cathode K, a first grid $G_1$, a second grid or anode electrode $G_2$, a control grid $G_3$ and a plate P. The voltage on the middle grid $G_2$ supplied by battery B may be of the order of a hundred volts positive relative to ground, while the other two voltages C and A are of the order of ten volts. Battery A is preferably a floating battery of small electrostatic capacity. It has been found experimentally that with such voltages there is a negative resistance between terminal T and ground. Hence, if a parallel tuned circuit of sufficiently high antiresonant impedance be connected between T and ground, oscillations are obtained; or if resistance and capacity are suitably associated with the system, relaxation oscillations will occur.

Fig. 2 shows a modification of Fig. 1 wherein the floating plate battery A of Fig. 1 is replaced by a choke feed for direct current, together with a condenser for keeping the plate P and cathode K at the same alternating current potential. For this purpose, there is used a condenser C' and a choke coil CH in circuit with a resistor R. The plate voltage may be reduced from the value applied to the middle grid $G_2$ (anode electrode) either by the tap shown or the dropping resistor R or by a combination of the two methods. The arrangement shown in Fig. 2 is useful, of course, only for frequencies such that the choke CH has a high impedance and the condenser C' a low impedance.

Fig. 3 shows an oscillator using an arrangement differing from Fig. 2 in that the separate bias battery C which is used in Figs. 1 and 2 for the third grid $G_3$ (control grid) is made unnecessary by the use of a cathode bias resistor R'. In this circuit, it will be seen that only a single voltage source B is used, resistor R acting to drop the plate voltage when the battery voltage is larger than suitable for the plate P. When using this circuit for generating sustained oscillations, the cathode resistor R' should not be too large, for a sufficient increase in this resistor will produce a combination of relaxation oscillations with oscillations of the tuned circuit frequency, giving a modulated high frequency output, and a still further increase in the value of R' may cause so much bias as to shut off the flow of plate current entirely.

I have found that a value of 500 ohms for resistor R' is suitable when the potential difference between the cathode and plate is about 10 volts, using an RCA 57 or 58 type tube. This value of resistor is not critical and merely illustrative since other values may be used with other values of potential differences between cathode and plate. For preliminary adjustments, it may be advisable to use a separate battery A, as shown in Fig. 1. Of course, this may be desirable in some circumstances. For generating relaxation oscillations only, the tuned circuit TC may be short-circuited. Output energy may be taken by coupling a coil L to the tuned circuit TC or by taking voltage from the cathode.

Fig. 4 shows an oscillator of the type shown in Fig. 3 with the addition of a signal tuned circuit TC' positioned between the third grid $G_3$ and ground, and provision for connecting a bias such as an AVC bias to this grid. Signals received over an antenna ANT are thus superposed on the oscillator by way of tuned circuit TC', and the resulting beat frequency currents in the plate circuit are selected out for intermediate frequency amplification through transformer Tr. The intermediate frequency output could also be taken from the middle grid circuit, but it is preferable to keep the potential of this grid constant, as shown by direct connection to Battery B.

While I have shown a first grid $G_1$ connected directly to cathode K in each of the figures, it should be noted that this grid may be maintained somewhat positive with respect to cathode, or in fact this grid may even be omitted entirely, especially if the cathode is operated at a temperature sufficiently reduced so that the cathode emission tends towards saturation.

What is claimed is:

1. A negative resistance device comprising a tube having a cathode, an anode electrode, a subsequent control grid and a collector electrode, means to maintain the anode electrode at a constant positive instantaneous value of potential with respect to ground, means to maintain the collector electrode at a substantially constant positive instantaneous value of potential with respect the cathode, means to maintain the control grid at a constant potential with respect to ground, and impedance means adapted to pass direct current connected between cathode and ground, whereby said tube functions to produce negative resistance across said impedance means.

2. An oscillation generator comprising a vacuum tube having a cathode, an anode electrode, a subsequent control grid and a collector electrode, means to maintain the anode electrode at a constant positive instantaneous value of potential with respect to ground, means to maintain the collector electrode at a substantially constant positive instantaneous value of potential with respect to the cathode, means to maintain the control grid at a constant potential with respect to ground, and a tuned circuit connected between said cathode and ground, whereby a negative resistance is produced between said cathode and ground.

3. A negative resistance device comprising a tube having a cathode, an anode electrode, a control grid and a plate in the order named; means to maintain said anode electrode at a constant positive potential and said control grid at a constant negative instantaneous value of potential relative to ground; and a battery of small electrostatic capacity connected between said cathode and plate for maintaining said plate at a constant positive instantaneous value of potential relative to said cathode, and impedance means adapted to pass direct current connected between cathode and ground, whereby the negative resistance between cathode and ground is obtained at all frequencies including zero.

4. A negative resistance device comprising a tube having a cathode, an anode electrode, a control grid and a plate in the order named; means to maintain said anode electrode at a constant positive instantaneous value of potential and means to maintain said control grid at a constant negative instantaneous value of potential relative to ground; a condenser of relatively low impedance for the range of useful frequencies connected between said plate and cathode, a circuit for maintaining said plate at a positive direct potential relative to ground less than the value applied to said anode electrode, including a choke coil of high impedance for the range of useful frequencies connected between said plate and a point on said first named means, and impedance means adapted to pass direct current connected between cathode and ground, whereby a negative resistance is produced between said cathode and ground at said range of useful frequencies.

5. An oscillation generator system comprising a vacuum tube having a cathode, a grid, a subsequent control grid and a plate, a connection from said control grid to ground, a condenser connected between said plate and cathode, a tuned circuit one terminal of which is connected to ground and the other terminal of which is connected through a circuit including a cathode bias resistor to said cathode, a source of direct current potential having its positive terminal connected to said first named grid and its negative terminal connected to ground, and a circuit of high impedance connected between the positive terminal of said source and said plate.

6. A converter system comprising a vacuum tube having a cathode, a grid, a subsequent control grid and a plate, a connection including an outlet circuit and a condenser connected between said plate and cathode, a tuned circuit one terminal of which is connected to ground and the other terminal of which is connected to said cathode through a circuit including a cathode bias resistor, a source of direct current potential having its positive terminal connected to said first named grid and its negative terminal connected to ground, a circuit of high impedance connected between the positive terminal of said source and said plate, and a signal input circuit connected between said control grid and ground.

7. A frequency converter comprising a vacuum tube having a cathode, a grid, a subsequent control grid and a plate, a signal input circuit connected between said control grid and ground, a tuned circuit one terminal of which is connected to ground and the other terminal of which is connected to said cathode through a circuit including a cathode bias resistor, a battery having its positive terminal connected to said first named grid and its negative terminal connected to ground, a capacitive path between said plate and cathode, an output circuit coupled across a part of said capacitive path, and a series circuit of a resistor and a choke coil in the order named connected between the positive terminal of said battery and said plate.

8. A system in accordance with claim 5, characterized in this that said circuit of high impedance includes a resistor and a choke coil.

9. In an electron discharge device system employing an electric device having a cathode, an anode, a control grid and a plate, means for producing a negative alternating current resistance between ground and said cathode comprising a single unidirectional potential power supply source, a direct connection from the negative terminal of said source to ground, a direct connection from the positive terminal of said source to said anode, a direct connection from said control grid to ground, a resistor between the positive terminal of said source and said plate, a condenser of low impedance at the operating frequency between said plate and cathode, and a tuned circuit having one terminal connected to ground and the other terminal connected to said cathode.

10. In an electron discharge device system employing an electric device having a cathode, an anode, a control grid and a plate, means for producing a negative alternating current resistance between ground and said cathode comprising a single unidirectional potential power supply source, a direct connection from the negative terminal of said source to ground, a direct connection from the positive terminal of said source to said anode, a direct connection from said control grid to ground, a series circuit of a resistor and a choke coil between the positive terminal of said source and said plate, a condenser of low impedance at the operating frequency between said plate and cathode, and a tuned circuit having one terminal connected to ground and the other terminal connected through a cathode bias resistor to said cathode.

11. In an electron discharge device system employing an electric device having a cathode, an anode, a control grid and a plate, means for producing a negative alternating current resistance between ground and said cathode comprising a single unidirectional potential power supply source, a direct connection from the negative terminal of said source to ground, a direct connection from the positive terminal of said source to said anode, a connection from said control grid to ground, a resistor between the positive terminal of said source and said plate, a condenser of low impedance at the operating frequency between said plate and cathode, a resistor for biasing said control grid negative relative to said cathode, and a tuned circuit having one terminal connected to ground and the other terminal connected to said cathode.

WALTER van B. ROBERTS.